United States Patent [19]

Zahner

[11] 4,043,069

[45] Aug. 23, 1977

[54] FISH HOOK SETTING DEVICE

[76] Inventor: Marvin L. Zahner, 421 N. Osage Drive, Skiatook, Okla. 74070

[21] Appl. No.: 699,715

[22] Filed: June 25, 1976

[51] Int. Cl.² .......................................... A01K 97/00
[52] U.S. Cl. ...................................... 43/15; 43/43.11
[58] Field of Search ......................... 43/15, 36, 43.11

[56] References Cited

U.S. PATENT DOCUMENTS

| 716,726 | 12/1902 | Leib | 43/15 |
|---|---|---|---|
| 2,504,822 | 4/1950 | Fritscher | 43/15 |
| 3,559,326 | 2/1971 | Henderson | 43/15 |

Primary Examiner—Russell R. Kinsey
Assistant Examiner—Daniel J. Leach
Attorney, Agent, or Firm—Head, Johnson & Chafin

[57] ABSTRACT

A fish hook setting device which is formed into a safety pin type configuration from an elongated segment of tempered wire. The triggering mechanism is configured from a second tempered wire having a helical coil lever arm to provide a sensitivity adjustment. The second embodiment includes an adjustable line drag mechanism for supporting one end of the fishing line.

8 Claims, 6 Drawing Figures

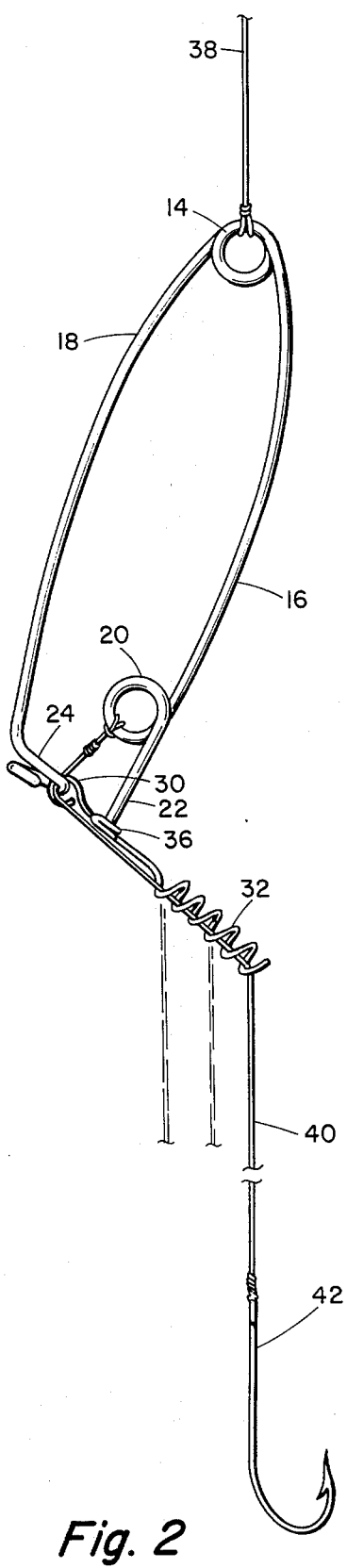
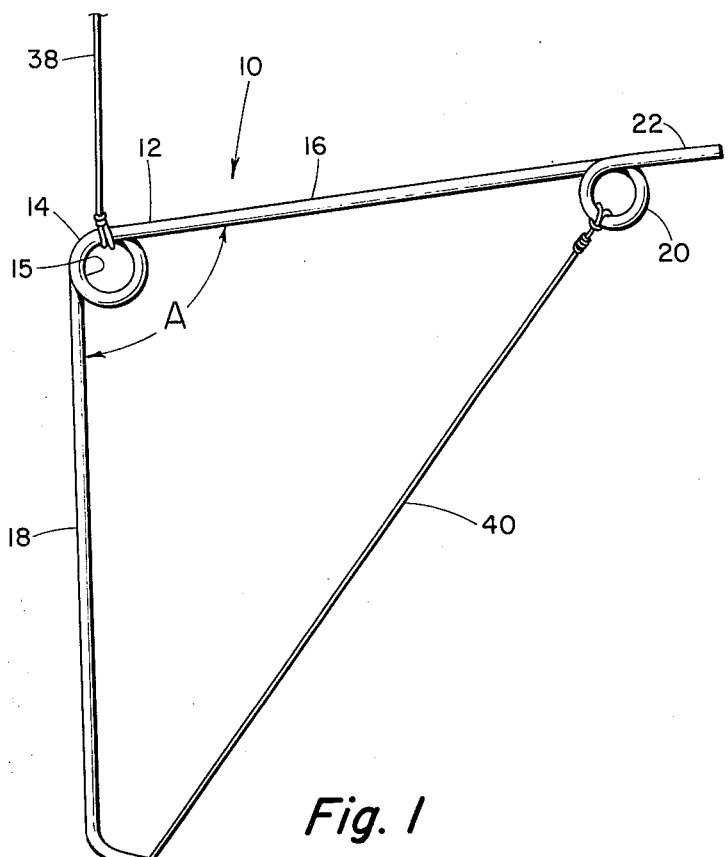
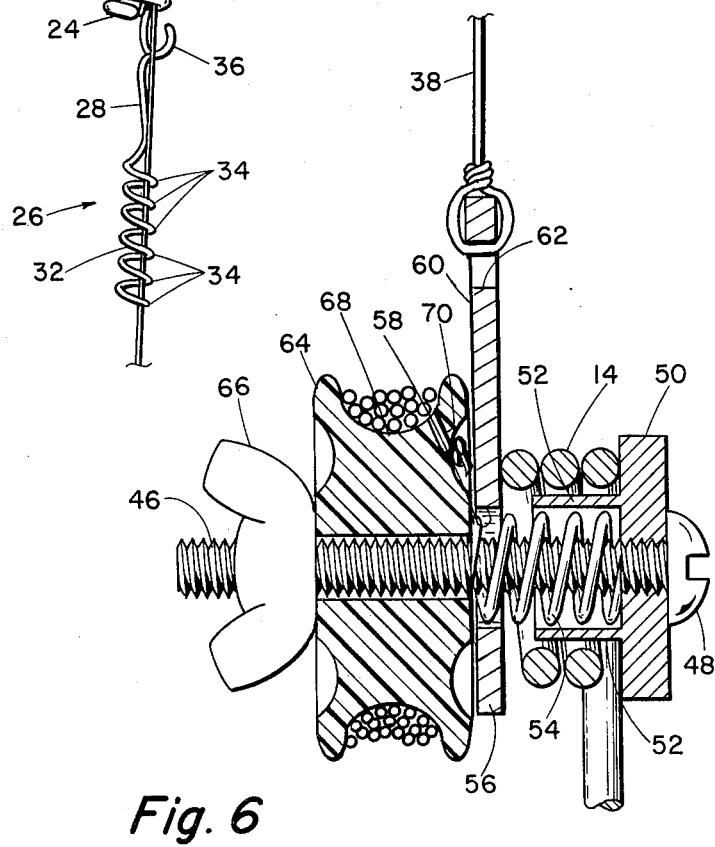
Fig. 1
Fig. 2
Fig. 6

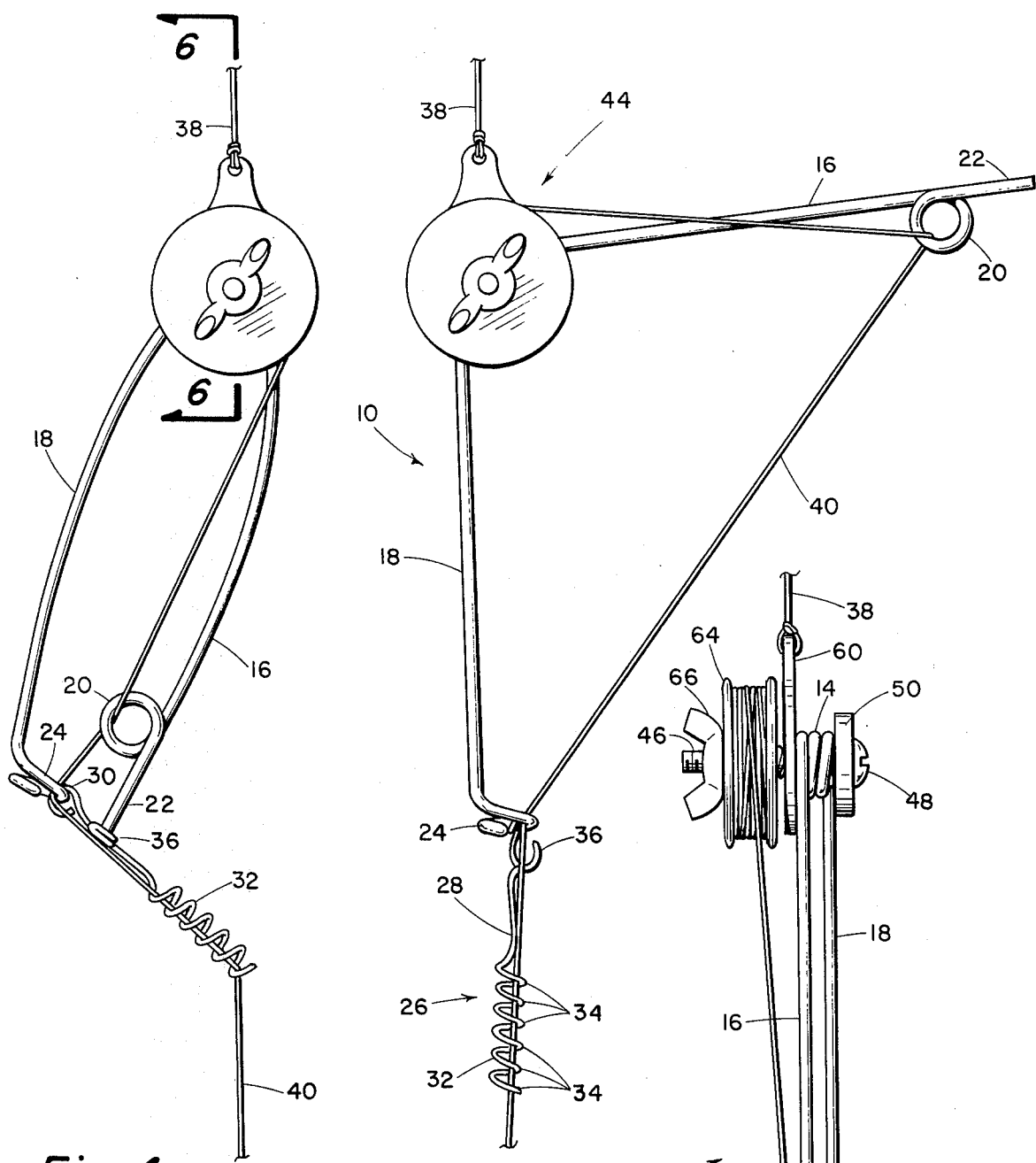

FISH HOOK SETTING DEVICE

BACKGROUND OF THE INVENTION

1. Field of the Invention

The present invention relates to a hook setting device and more particularly, but not by way of limitation, to a safety pin type spring device which may be latched against the torsion force of the spring and triggered by a fish having taken the hook. An adjustable line drag is also embodied.

2. Description of the Prior Art

A very popular mode of fishing in lakes and slow running streams is that of limb-line fishing. Limb-line fishing in its simpliest form is that of attaching one end of a fishing line to a limb or branch of a tree which extends over the water, the free end of the line being provided with hook and bait.

However, many fish are lost when utilizing this method since when taking the bait, there is no jerking action for setting the hook in the fish's mouth. Further, even if the hook becomes set, the rapid movement of the fish against the unyielding branch or limb often causes line breakage.

The basic problem of initially setting the hook has been addressed by various inventions, the most pertinent being shown in the patent to Henderson, U.S. Pat. No. 3,559,326 issued in 1971 wherein a tempered wire is formed into a compressible bow spring to which one end of the fishing line is attached. The spring is latchable by means of a pivotal trigger member, the outer end of which is provided with an eyelet for passing the fishing line therethrough.

There are two basic problems associated with the Henderson type device, the first being the expensive provision of a pivotal arm and the fact that the arm is not adjustable for sensitivity. It is often the case when using live bait, that the sensitivity is such that the bait itself will trigger the mechanism.

The second disadvantage of the Henderson device is that after the fish is hooked, there is very little give in the line to compensate for hard pulls by the fish which can result in line breakage.

SUMMARY OF THE PRESENT INVENTION

The present invention provides a hook setting device which is particularly designed and constructed to overcome the above disadvantages.

The present device is a bow or safety pin type apparatus formed by an elongated tempered wire coiled at the center into a torsion spring having leg members extending radially from the spring at approximately right angles to each other.

The outer end of each leg member is provided with first and second eyelets. One end of one leg member extends beyond the first eyelet to serve as a latch finger.

A triggering member is formed from a second elongated tempered wire, usually of a lighter material than the first wire. One end of the triggering member is pivotally attached to the second eyelet, the free end thereof being formed into a helical coil section having spaced convolutions. Between the helical coil section and the pivotal attachment, is a hook member for receiving the latching finger therein when the leg members are compressed together against the force of the torsion spring.

The fishing line is secured to the apparatus and is passed through the first eyelet and then through the second eyelet. The line is then threaded down the center of the helical coil of the trigger member. The line then exits the helical coil at the outer end thereof or at any desired convolution of said coil according to the desired triggering sensitivity.

Considering the triggering member as the lever arm, when the line exits the helical coil at the outer end, it is most sensitive. The sensitivity decreases if the line exits at a convolution of the coil near the hook member. This configuration provides a simple and efficient adjustable triggering mechanism which can be constructed from a single segment of tempered wire.

The fishing line may be attached to the apparatus at either the first eyelet or even at the torsion spring. Another embodiment of the present invention comprises an adjustable line drag mechanism attachable to the torsion spring for absorbing shock when the fish, after being hooked, pulls severely on the line.

The line drag includes a rotatable sheave member for accepting several wraps of the fishing line. The sheave member has an adjustable compression spring associated therewith for frictionally varying the rotational movement thereof according to the desired drag.

DESCRIPTION OF THE DRAWINGS

Other and further advantageous features of the present invention will hereinafter more fully appear in connection with a detailed description of the drawings in which;

FIG. 1 depicts a fish hook setting device in its simplest form and in an open or triggered position.

FIG. 2 depicts the hook setting device of FIG. 1 but in a cocked or latched position.

FIG. 3 depicts the hook setting device of FIG. 1 in an open position having a line drag means attached thereto.

FIG. 4 depicts the hook setting device of FIG. 3 in a cocked or latched position.

FIG. 5 depicts the hook setting device in FIG. 4 at a view of 90° from the view shown in FIG. 5.

FIG. 6 depicts a partial sectional detail of the line drag apparatus taken along the broken lines 6—6 of FIG. 4.

DETAILED DESCRIPTION OF THE INVENTION

Referring to the drawings and particularly to FIGS. 1 and 2, reference character 10 generally indicates a fish hook setting device comprising an elongated tempered wire 12 which is formed into a safety pin type configuration having a centrally disposed spring loop or torsion spring 14. A pair of elongated leg members 16 and 18 extend radially outwardly from said spring loop or torsion spring 14.

The torsion spring 14 has an aperture 15 therethrough with axis perpendicular to the general plane containing the leg members 16 and 18.

An eye member 20 is formed near the outer end of leg member 16 such that a short end portion 22 extends outwardly beyond the said eye member or eyelet 20. A second eyelet 24 is provided at the outer end of leg member 18. The eyelet 24 may be configured to lie in a plane perpendicular to the leg member 18 but is not necessarily so configured. For ease of construction, the eyelet 20 is formed to lie in a plane which coincides with the plane of the leg member 16. However, this again is not a necessary feature for the workability of the invention.

Reference character 26 generally indicates a triggering member which comprises an elongated tempered wire member 28 having an eyelet 30 at one end thereof, said eyelet 30 being pivotally attached to the eyelet 24 of the leg member 18. The opposite end portion of the triggering member 26 comprises a helical coil member 32 having a plurality of longitudinally spaced convolutions 34 as a part thereof. The triggering member 28 further comprises a hook member 36 formed therein with the open face thereof directed toward the eyelet 30.

One end of an attachment cord 38 or the like may be attached to the torsion spring 14, the opposite end being attached to a limb or branch overhanging the water or even to a boat dock or other objects which extend over the fishing waters (not shown).

In this configuration, a fishing line 40 has one end thereof attached to the eyelet 20, the other end being passed through the eyelet 24 and further through the convolutions 34 of the helical coil 32. The free end of the fishing line 40 may be provided with a fishing hook 42 or other similar device for hooking fish.

FIG. 1 depicts the hook setting device 10 in a relaxed position showing the angle A between the leg members 16 and 18 being substantially at 90°. This angle A may vary substantially according to the travel desired of the line 40 in setting the hook as will be hereinafter set forth.

Referring to FIG. 2 in order to cock or latch the hook setting device, the leg members 16 and 18 are forced substantially together while the latch finger or extending end segment 22 of the leg 16 is placed inside the hook member 36 of the triggering means 26 in order to hold the device in its compressed position as shown in FIG. 2 against the force of the torsion spring 14.

It is readily seen that disengaging the latch finger 22 from the hook member 36 may be accomplished by the downward force on the helical coil 32 which will cause the device to spring open as shown in FIG. 1 thereby pulling a certain amount of the line 40 through the eyelet 24 causing the hook 42 to jerk upwardly in the fish's mouth.

It is also obvious that since the helical coil segment 32 acts as a lever arm in releasing the latching finger 22, the sensitivity thereof may be varied by allowing the fishing line 40 to exit the helical coil 32 at one of the various helical coil convolutions 34. More specifically, when the fishing line 40 is permitted to exit at the outer end of the coil 32, the triggering means will be most sensitive whereas, when the line 40 exits one of the helical coil convolutions 34 at a position closer to the hook 36, the triggering means will be less sensitive. It is further seen that the pulling or jerking power of the hook setting device 10 may be varied by the strength of the tempered wire 12 and the angle A by which the leg members are radially separated.

Referring now to FIGS. 3 through 6, reference character 44 generally indicates a line drag mechanism that may be secured to the hook setting device 10 at the torsion spring thereof. The hook setting device 10 is identical to that described in relation to FIGS. 1 and 2 but with the addition of the line drag means 44 that will be hereinafter described.

The line drag means 44 comprises an elongated threaded rod 46 extending through the aperture 15 of the torsion spring 14. The rod 46 is provided with a bolt head 48 at one end thereof. A bolt head plate 50 is secured to the rod adjacent said bolt head 48 and has an outer diameter greater than the diameter of the torsion spring 14 and is disposed against one end of said torsion spring 14. The bolt head plate 50 is provided with a cylindrical sleeve member 52 centrally disposed thereon and being coaxially aligned with the axis of the threaded rod 46. The outer diameter of the sleeve member 52 is less than the diameter of the torsion spring aperture 15. The inner diameter of the sleeve 52 is greater than the diameter of the threaded rod 46.

A helical compression spring 54 is loosely disposed around threaded rod 46 and has one end thereof disposed against the bolt head plate 50. The spring 54 is disposed along said threaded rod 46 and extends beyond the end of the sleeve member 52. A flat plate member 56 having a bore 58 therethrough, is reciprocally disposed on the rod 46, the diameter of the bore 58 being large enough to reciprocally receive the rod 46 and compression spring 54 therethrough but smaller than the aperture 15 of the torsion spring 14. The plate 56 also includes a cord attachment portion 60 having a eyelet 62 therethrough for attaching the cord 38 as herinbefore described.

A sheave member 64 is journalled on the rod 46, one side thereof being in contact with the free end of the compression spring 54. The sleeve is held in place by a suitable wing nut 66 threaded on the end of the rod 46.

The sheave member 64 is provided with an annular cradle portion 68 for holding a plurality of wraps of the fishing line 40.

In connection with the cradle 68 of the sheave member is a bore 70 for firmly securing one end of the fishing line thereto.

In utilizing the device, the plate member 56 is secured to an object overhanging the water by means of a cord 38. A fishing line 40 is secured to the sheave member 64 by means of the bore 70 as shown in FIG. 6 and is wrapped several times around the sheave member. The free end of the fishing line 40 is threaded first through the eyelet 20 of the leg member 16 and then through the eyelet 24 of the leg member 18. The line is then passed through the desired number of convolutions 34 of the helical coil 32. The leg members 16 and 18 are then pressed together and latched by the hook member 36 as hereinbefore described. To adjust the drag of the sheave member 64, the wing nut 66 is either tightened or loosened against the force of the compression spring 54.

From the foregoing, it is obvious that the present invention provides a simple and efficient fish hook setting device which has triggering means adjustable for sensitivity and has drag means frictionally adjustable for paying out the line after a fish has been hooked.

Whereas, the present invention has been described in particular relation to the drawings attached hereto, other and further modifications apart from those shown or suggested herein may be made within the spirit and scope of the invention.

What is claimed:

1. A fish hook setting device comprising an elongated tempered wire formed into two elongated leg members joined by a spring loop, said leg members extending radially outwardly from said spring loop in a relaxed position, an eye formed in the first leg member adjacent the outer end thereof and having a short end piece extending beyond said eye, an elongated trigger member being pivotally attached at one end to the outer end of the second leg member, said trigger member comprising latch means secured adjacent said pivot attachment and engageable with the short end piece when the leg members are compressed together, the free end portion of the trigger member having a plurality of longitudinally spaced fishing line carrying means therealong.

2. A fish hook setting device as set forth in claim 1 wherein the latch means is a hook member having an open portion thereof being directed toward the pivot attachment thereof for receiving the short end piece therein.

3. A fish hook setting device as set forth in claim 1 wherein the plurality of fishing line carrying means is an elongated helical coil member having longitudinally spaced convolutions.

4. A fish hook setting device as set forth in claim 1 wherein the outer end of the second leg member is formed into a closed eye, the trigger means comprising a second elongated tempered wire having an eye member at one end pivotally secured to said closed eye, an open hook formed adjacent said eye member and being engageable with said short end piece, and the outer free end portion of said second elongated tempered wire being formed into an elongated helical coil having spaced convolutions.

5. A fish hook setting device as set forth in claim 1 and including fishing line drag means carried by said spring loop.

6. A fish hook setting device as set forth in claim 5 and including drap adjustment means carried by said drag means.

7. A fish hook setting device as set forth in claim 6 wherein said drag means comprises an elongated rod disposed through said spring loop and threaded at one end thereof, a bolt head plate secured to the opposite end of said rod and having an elongated sleeve member attached thereto, said sleeve member surrounding said rod and being spaced thereform, said bolt head plate being disposed against the spring loop with the sleeve member extending through said loop, a flat plate member having a bore therethrough reciprocally carried on said rod, one side thereof disposed against the opposite side of said spring loop, a line carrying sheave journalled on said rod adjacent said flat plate, an elongated helical compression spring carried by said rod between the bolt head plate and the sheave, and nut means threadedly disposed on the end of the rod and engageable with the other side of the sheave.

8. An elongated tempered wire formed into two elongated radial spaced leg members, joined by a torsion spring loop, an eye formed in the first leg member adjacent the outer end thereof and having a short end piece extending beyond said eye, a trigger member carried by the outer end of the second leg member and being latchedly engageable with the short end piece of the first leg member when the leg members are forced together against the force of the spring loop, and drag means carried by the tempered wire and comprising fishing line attachment means, rotatable sheave member for carrying a plurality of wraps of fishing line and means for adjusting the rotational friction of the sheave for drag adjustment.

* * * * *